United States Patent
Freund et al.

[11] Patent Number: 5,988,581
[45] Date of Patent: Nov. 23, 1999

[54] SINGLE HORIZONTAL DRIVE FOR A VEHICLE SEAT

[75] Inventors: Roger Freund, Port Sydney; Pascal Garrido, Gravenhurst, both of Canada

[73] Assignee: Meritor Light Vehicle Systems LLC, Troy, Mich.

[21] Appl. No.: 09/113,486

[22] Filed: Jul. 10, 1998

[51] Int. Cl.⁶ .................................................. F16M 13/00
[52] U.S. Cl. ................. 248/429; 296/65.15; 297/452.18
[58] Field of Search ................................... 248/424, 429, 248/430, 419, 394; 297/344.1, 452.18; 296/65.15, 65.13

[56] References Cited

U.S. PATENT DOCUMENTS

| | | | |
|---|---|---|---|
| 4,015,812 | 4/1977 | Heesch | 248/394 |
| 5,112,018 | 5/1992 | Wahls | 248/394 |
| 5,224,749 | 7/1993 | Gauger et al. | 248/429 X |
| 5,349,878 | 9/1994 | White et al. | |
| 5,427,345 | 6/1995 | Yamakami et al. | 248/394 |
| 5,445,345 | 8/1995 | Gauger et al. | 248/429 |
| 5,456,439 | 10/1995 | Gauger | 248/429 |
| 5,575,531 | 11/1996 | Gauger et al. | 248/429 X |
| 5,735,500 | 4/1998 | Borlinghaus et al. | 248/419 |
| 5,816,555 | 10/1998 | Ito et al. | 248/429 |

Primary Examiner—Ramon O. Ramirez
Attorney, Agent, or Firm—Howard & Howard

[57] ABSTRACT

A power seat positioning device for automatically adjusting the horizontal fore and aft position of a seat within a vehicle using a single electric motor. A lower track assembly is attached to a vehicle floor and includes a first and second laterally spaced lower track members. An associated upper track assembly attaches to a vehicle seat and includes a first and second upper track member which slide within the first and second lower track members respectively to adjust the for and aft position of the seat within the vehicle. A drive motor and gearbox arrangement is supported on the first upper track to provide the motive force which drives only the first upper track relative to the first lower seat track. A brace member directly connects the first upper track to the second upper track to coordinate the horizontal position of the first upper seat track with the position of the second upper seat track.

18 Claims, 3 Drawing Sheets

SINGLE HORIZONTAL DRIVE FOR A VEHICLE SEAT

BACKGROUND OF THE INVENTION

The present invention generally relates to a motorized system for adjusting the horizontal position of a vehicle seat using a single drive motor.

A variety of vehicle seats are commercially available. In many instances, it is desirable to provide a seat occupant with the ability to adjust the position of the seat base relative to the floor of the vehicle. A variety of powered seat adjustment mechanisms are available for use on the driver's seat and on the front passenger seat of the vehicle.

Known power seat adjusters typically carry a seat support frame which supports the seat bottom and sometimes the seat back of a vehicle seat. The seat support frame is mounted on first and second laterally spaced track assemblies, each formed of an upper track which is connected to the seat support frame and which is slidably mounted on a lower track anchored to the vehicle floor. A motor drive mechanism typically includes at least one bi-directional electric motor which rotates a pair of drive shafts extending outward from the motor to a gear assembly or box mounted on each upper track. In one known arrangement, each gear box rotates a lead screw extending longitudinally below each upper track. A drive block is fixedly mounted to each lower track and threadingly receives the lead screw to cause reciprocal, horizontal movement of the upper track and the attached seat support frame upon selective energization of the drive motor and the drive shafts.

One challenge associated with the currently available automated seat adjustment mechanisms is that they include relatively expensive components which must be duplicated along each track. The duplication of identical components increases the weight and the cost of the seat and therefore the overall cost of the vehicle to the consumer.

SUMMARY OF THE INVENTION

This present invention provides a unique horizontal drive arrangement for a vehicle seat that avoids the problems of the prior art described above. Further, the present invention provides a unique brace and slide member arrangement that maintains the structural integrity of the vehicle seat while decreasing the duplication of components.

In general terms, this invention is a power seat positioning device for automatically adjusting the horizontal position of a seat within a vehicle using a single electric motor. A lower track assembly is attached to a vehicle floor and includes first and second laterally spaced lower track members. An associated upper track assembly attaches to a vehicle seat and includes a first and second upper track member which slide within the first and second lower track members respectively to adjust the position of the seat within the vehicle. A drive motor and gearbox arrangement is supported on the first upper track to provide the motive force which horizontally adjusts the position of the first upper track member relative to the lower track member. The drive motor is actuated by a switch whenever a seat occupant desires to adjust the horizontal position of the seat. The drive motor drives only the first upper track relative to the first lower seat track. A brace member directly connects the first upper track to the second upper track to coordinate the horizontal position of the first upper seat track with the position of the second upper seat track. The brace member therefore directly links any motion of the powered first upper track with the associated slave second upper track to eliminate the necessity of duplicating the drive motor and gearbox from the second upper track.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
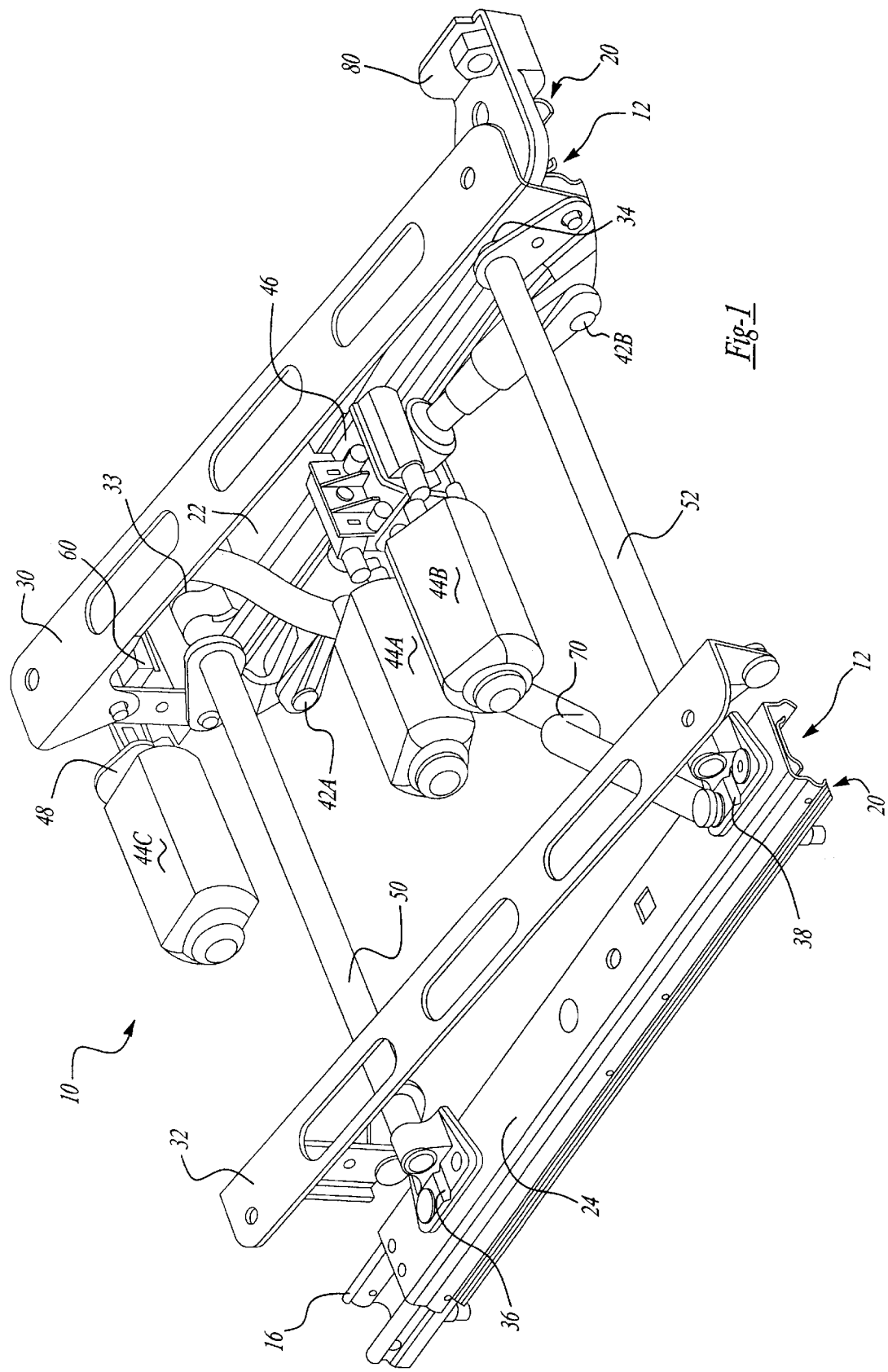
FIG. 1 is a diagrammatic, perspective illustration of a horizontal drive mechanism designed according to this invention.

FIG. 1 diagrammatically illustrates a drive assembly 10 for a powered vehicle seat. A lower track assembly 12 is attached to a vehicle floor in a conventional manner and includes a first lower track member 14 and a second lower track member 16 laterally spaced apart. An upper track assembly 20 for attachment to a powered vehicle seat (not shown) includes a first upper track member 22 and a second upper track member 24. The first 22 and second 24 upper track members are slidably attached to the first 14 and second 16 lower track members respectively to adjust the for and aft position of the seat within the vehicle. A pair of seat support brackets 30 and 32 are adapted to be secured to the bottom of a seat base portion of the vehicle seat (not illustrated). The seat support bracket 30 is supported by mounting brackets 33 and 34 which are secured to the first upper track 22. Similarly, seat support bracket 32 is supported by a pair of mounting brackets 36 and 38 on the second upper seat track 24, independently moveable relative to the second lower seat track 16 that is also secured to the vehicle floor.

Figure 2:
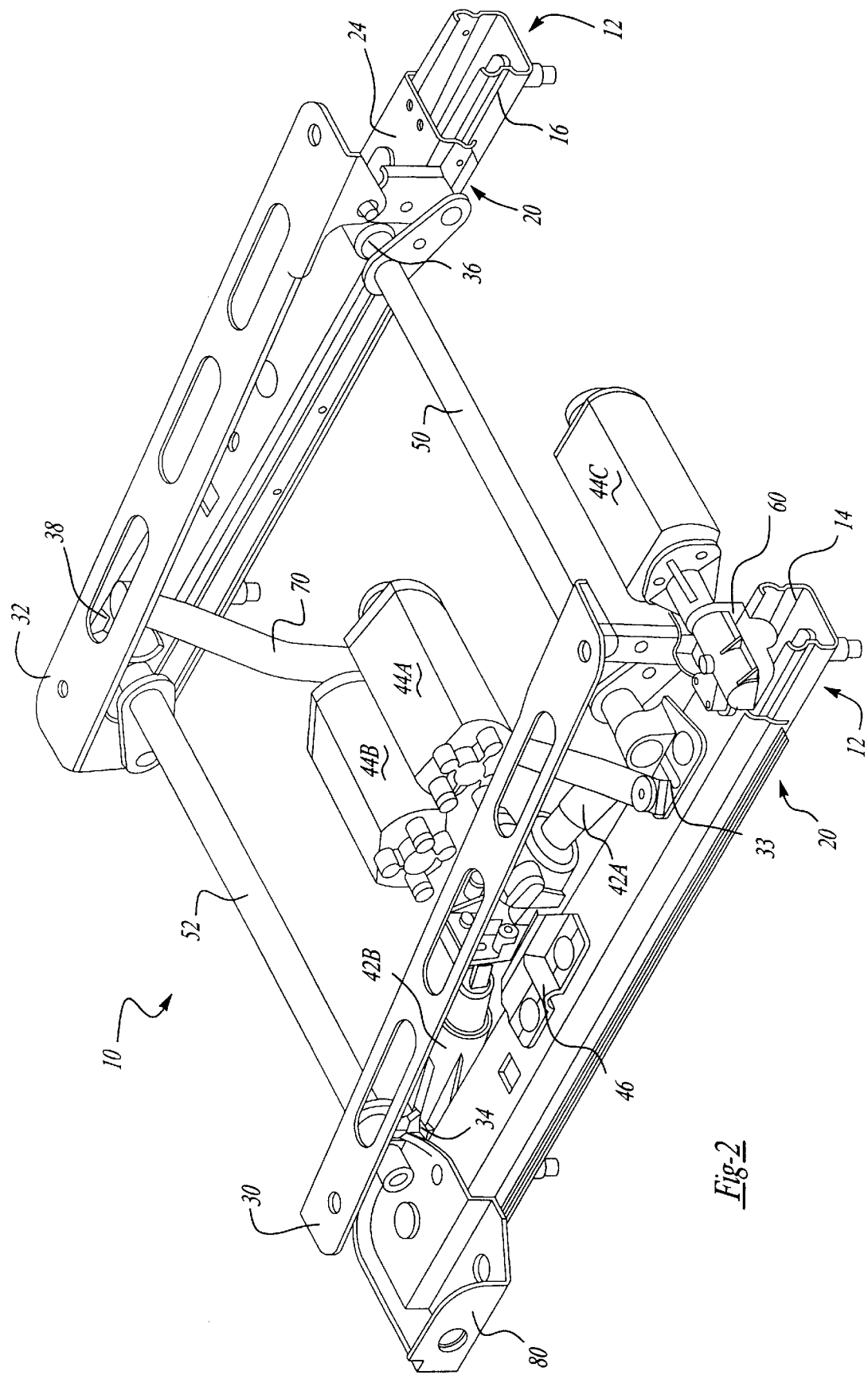
FIG. 2 is a diagrammatic, perspective illustration of a horizontal drive mechanism of FIG. 1 shown from the opposite direction.

FIG. 2 illustrates a perspective view (according to the drawing) from the opposite side of FIG. 1. A linkage assembly 42A,42B provides the connection between the seat support bracket 30 and the mounting brackets 32 and 34, respectively. A pair of drive motors 44A,44B are supported on the first upper track 22 by a motor mounting bracket 46 so that the linkage assembly 42A,42B and the drive motors 44A,44B move with the first upper track 22 whenever a seat occupant adjusts the forward position of the seat. Drive motors 44A,44B provide the motive force to vertically adjust the seat support brackets 30 and 32 relative to the first 22 and second 24 upper track members.

Since the drive motors 44A,44B are located on one side of the drive assembly 10, a pair of torsion bars 50 and 52 connect the seat support brackets 32,34 with seat support brackets 36,38 respectively. Torsion bars 50,52 provide for a coordinated positioning of the seat support bracket 30 with the position of the seat support bracket 32, which is dictated by the operation of the drive motors 44A,44B and the corresponding orientation of the linkage assembly 42A,42B. This basic use of torsion bars 50 and 52 is known from the prior art.

To provide horizontal motion to the vehicle seat a drive motor 44C is supported on the first upper track 22 by a motor mounting bracket 48 to provide the motive force which horizontally adjusts the fore and aft positioning of the vehicle seat (not shown) relative to the vehicle floor. The drive motor 44C is actuated whenever a seat occupant desires to adjust the horizontal position of the seat. As the drive motors 44A,44B, and 44C are preferably electric motors, the mechanism for their actuating can be any conventional switching arrangement that is positioned within the vehicle to provide easy access to a seat occupant.

Upon actuation, a motor shaft (not shown) of the drive motor 44C rotates about its central longitudinal axis to drive a gearbox 60 arranged in a know perpendicular orientation. The preferable perpendicular arrangement of gearbox 60 transfers the axial shaft motion of the drive motor 44C into for and aft motion so the first upper seat track 22 is moved relative to the first lower seat track 14. Further, the perpendicular arrangement provides the ability to more easily fit the single horizontal drive motor 44C in place beneath the vehicle seat.

The drive motor 44C drives only the first upper track 22 relative to the first lower seat track 14. A brace member 70 directly connects the first upper track 22 to the second upper track 24. The brace member 70 thus coordinates the horizontal position of the first upper seat track 22 with the position of the second upper seat track 24. The brace member 70 therefore directly links any motion of the powered first upper track 22 with the associated slave second upper track 24 thereby eliminating the necessity of duplicating the drive motor 44C and gearbox 60 from the second upper track 24.

Figure 3:
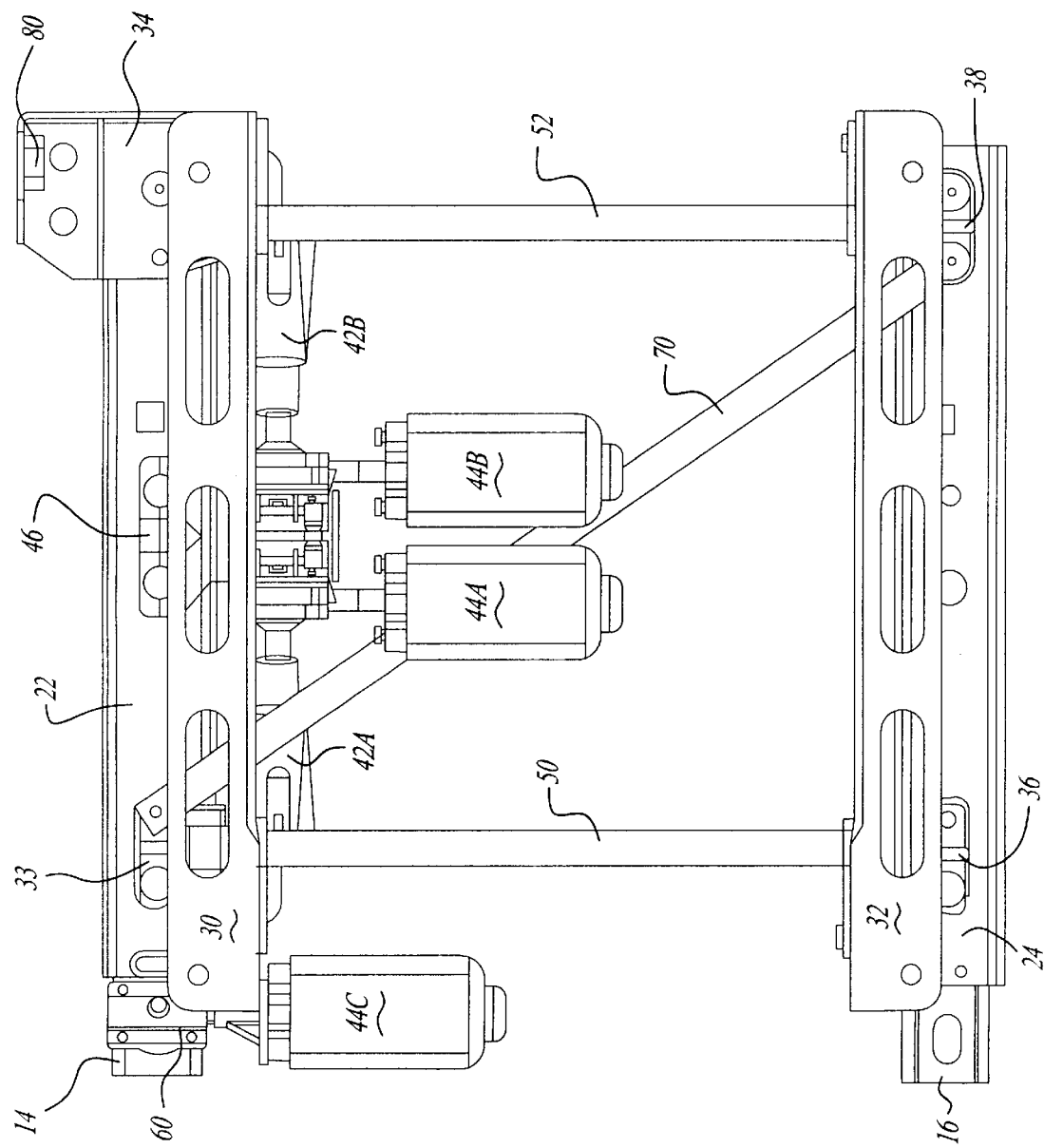
FIG. 3 is a top plan view of a horizontal drive mechanism designed according to this invention.

The brace member 70 is further shown in FIG. 3, a top plan view of a horizontal drive mechanism according to this invention. The brace member 70 allows the preferable usage of a simple single ended motor equivalent to motors 44A and 44B to increase commonality of parts without decreasing the structural rigidity of the drive assembly. The brace member 70 is preferably of a tubular cross-section to provide maximum strength and light weight. Applicants have further determined that structural integrity of the upper track assembly 20 is greatest when he brace member 70 is preferably oriented in a diagonal relationship between the forward mounting bracket 33 of the powered first upper track 22 and the rear mounting bracket 38 of the slave second upper track 24. Additionally, the seat belt mounting bracket 80 is preferably mounted to the driven first upper track 22 to further assure the rigidity of the vehicle seat and passenger thereof.

The foregoing description is exemplary rather than limiting in nature. Obviously, many modifications and variations of the present invention are possible in light of the above teachings. It is, therefore, to be understood that within the scope of the appended claims the invention may be practiced otherwise than as specifically described.

What is claimed is:

1. A horizontal drive apparatus for a power seat adjuster comprising:

a lower track assembly having a first lower track member and a second lower track member, said first and second lower members being laterally spaced apart;

an upper track assembly having a first upper track member and a second upper track member, said first and second upper track members slidable relative to said first and second lower track members respectively;

a brace member fixed to said first and second laterally spaced upper track member, said brace member extending diagonally between said first and second laterally spaced upper track members;

a drive motor for selectively moving said first upper track member relative to said first lower track member; and said brace member moving said second upper track member relative to said second lower track member in response to movement of said first upper track member.

2. The horizontal drive apparatus of claim 1, further comprises a gearbox having an arrangement for mounting said drive motor perpendicular to said first upper track member.

3. The horizontal drive apparatus of claim 1, wherein said brace member is affixed to a forward portion of said first upper track member and to a rear portion of said second upper track member.

4. The horizontal drive apparatus of claim 1, wherein said brace member has a tubular cross section.

5. The horizontal drive apparatus of claim 1, further comprising a seat belt mounting bracket attached to said first upper track member.

6. The horizontal drive apparatus of claim 1, wherein said drive motor is a single ended reversible electric drive motor.

7. The horizontal drive apparatus of claim 1, wherein said drive motor is mounted to said first upper track member.

8. The horizontal drive apparatus of claim 1, wherein said drive motor is mounted between said first upper track member and said second upper track member.

9. A power seat for a vehicle comprising:

a lower track assembly adapted to be attached to said vehicle having a first lower track member and a second lower track member, said first and second lower members being laterally spaced apart;

an upper track assembly attached to said power seat having a driven first upper track member and a slave second upper track member, said driven first upper track member and said slave second upper track members slidable relative to said first and second lower track members respectively;

a brace member fixed to said first and second laterally spaced upper track members;

a drive motor mounted to said driven first upper track member for selectively moving said driven first upper track member relative to said first lower track member;

said brace member moving said slave second upper track member relative to said second lower track member in response to movement of said driven first upper track member.

10. The horizontal drive apparatus of claim 9, further comprises a gearbox having an arrangement for mounting said drive motor perpendicular to said first upper track member.

11. The power seat of claim 9, wherein said brace member extends diagonally between said first and second laterally spaced upper track members.

12. The power seat of claim 9, wherein said brace member is affixed to a forward portion of said first upper track member and to a rear portion of said second upper track member.

13. The power seat of claim 9, wherein said brace member has a tubular cross section.

14. The power seat of claim 9, further comprising a seat belt mounting bracket attached to said first upper track member.

15. The power seat of claim 9, wherein said drive motor is mounted under said seat.

16. The power seat of claim 9, wherein said drive motor is mounted between said first upper track member and said second upper track member.

17. A power seat for a vehicle comprising:

a lower track assembly adapted to be attached to the vehicle having a first lower track member and a second lower track member, said first and second lower members being laterally spaced apart;

an upper track assembly Attached to said power seat having a first upper track member and a second upper track member, said first and second upper track members slidable relative to said first and second lower track members respectively;

a brace member diagonally affixed to a forward portion of said first upper track member and to a rear portion of said second upper track member;

a drive motor mounted perpendicular to said first upper track member for selectively moving said first upper track member relative to said first lower track member;

a seat belt mounting bracket attached to said first upper track member; and said brace member moving said second upper track member relative to said second lower track member in response to movement of said first upper track member.

18. The power seat of claim 17, wherein said brace member has a tubular cross section.

* * * * *